(12) United States Patent
Nishijima

(10) Patent No.: US 7,786,641 B2
(45) Date of Patent: Aug. 31, 2010

(54) MAGNETIC MEMBER, ROTOR AND MOTOR

(75) Inventor: Kiyotaka Nishijima, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 271 days.

(21) Appl. No.: 11/885,161

(22) PCT Filed: Feb. 1, 2006

(86) PCT No.: PCT/JP2006/301671

§ 371 (c)(1),
(2), (4) Date: Apr. 3, 2008

(87) PCT Pub. No.: WO2006/092921

PCT Pub. Date: Sep. 8, 2006

(65) Prior Publication Data

US 2009/0152972 A1    Jun. 18, 2009

(30) Foreign Application Priority Data

Feb. 28, 2005    (JP) .............................. 2005-053669

(51) Int. Cl.
*H02K 1/27* (2006.01)

(52) U.S. Cl. ............................. 310/156.57; 310/156.53; 310/156.56

(58) Field of Classification Search ............ 310/156.38, 310/156.41, 156.45, 156.49, 156.53, 156.56–156.58, 310/156.62, 156.78; *H02K 1/26, 1/27, 21/14, H02K 21/16*

See application file for complete search history.

(56) References Cited

U.S. PATENT DOCUMENTS 6,717,314 B2 * 4/2004 Horst et al. ............ 310/156.43
7,362,025 B2 * 4/2008 Utaka .................... 310/156.57

FOREIGN PATENT DOCUMENTS

| JP | H10-136594 | 5/1998 |
| JP | H11-098731 | 4/1999 |
| JP | H11-206049 | 7/1999 |
| JP | 3028669 | 2/2000 |
| JP | 2000-217287 | 8/2000 |
| JP | 2001-008417 | 1/2001 |
| JP | 2001-016809 | 1/2001 |
| JP | 2002-044888 | 2/2002 |
| JP | 2003324875 A * | 11/2003 |
| JP | 2004-180460 | 6/2004 |

* cited by examiner

*Primary Examiner*—Tran N Nguyen
(74) *Attorney, Agent, or Firm*—Global IP Counselors

(57) ABSTRACT

In the present invention, since gaps respectively provided at one ends of a field magnet through-hole respectively extend toward the other ends passing on the side of a periphery with respect to the field magnet through-hole, the radial dimension of the magnetic member in this portion can be made smaller than the center of magnetic poles, so that the difference in thickness of the magnetic member in the radial direction between the border of magnetic poles and the magnetic poles can be reduced. Accordingly, the asymmetry of the configuration of a rotor is not absolutely necessary, and the outer surface does not need to be depressed for reducing the torque ripple.

13 Claims, 15 Drawing Sheets

F I G. 6
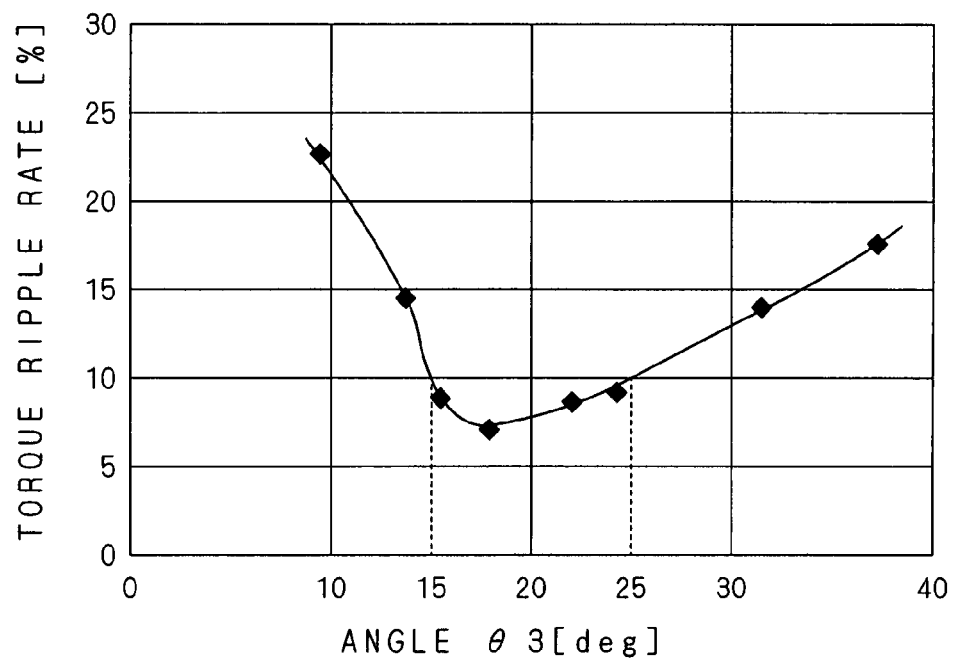
F I G. 7
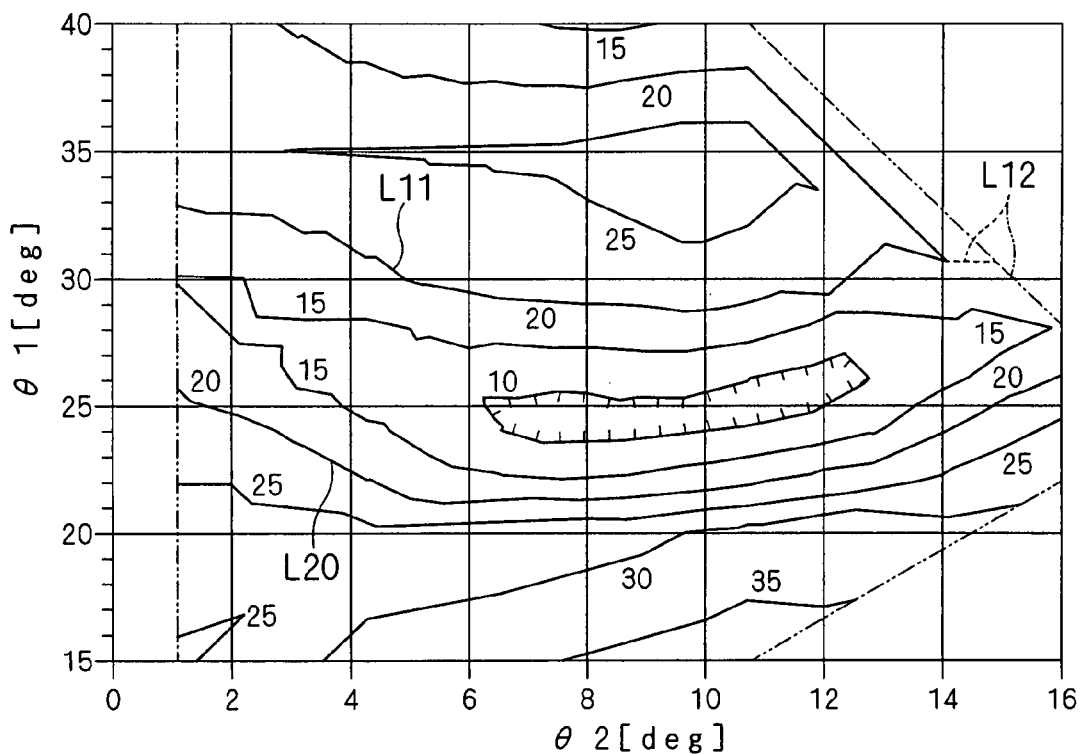

US 7,786,641 B2

MAGNETIC MEMBER, ROTOR AND MOTOR

CROSS-REFERENCE TO RELATED APPLICATIONS

This U.S. National stage application claims priority under 35 U.S.C. §119(a) to Japanese Patent Application No. 2005-053669, filed in Japan on Feb. 28, 2005, the entire contents of which are hereby incorporated herein by reference.

TECHNICAL FIELD

This invention relates to a motor, particularly to the structure of a rotor.

BACKGROUND ART

The technique for reducing the torque ripple of a motor has conventionally been proposed. For instance, various devices are disclosed in the following patent documents.

Japanese Patent No. 3028669 discloses a technique for providing skews in a rotor, and Japanese Patent Application Laid-Open No. 2001-8417 discloses a technique for providing skews in a stator. In terms of productivity, however, providing skews is not desirable.

Japanese Patent Application Laid-Open No. 11-98731 focuses attention to the configuration of magnetic flux barrier present between magnetic poles of a rotor, and intends to reduce the torque ripple by setting the angle it makes at a predetermined value or at an unequal pitch.

Japanese Patent Application Laid-Open No. 2000-217287 illustrates a technique for varying the thickness of a bridge present between a magnetic barrier of a rotor and an outer periphery, Japanese Patent Application Laid-Open No. 2002-44888 illustrates a technique for setting the angle of magnetic poles of a rotor within a predetermined range, and Japanese Patent Application Laid-Open No. 2004-180460 illustrates a technique for setting the angle of tip of a magnetic barrier of a rotor within a predetermined range.

However, employing an unequal pitch as in Japanese Patent Application Laid-Open No. 11-98731 absolutely requires of the rotor to have an asymmetric configuration in the circumferential direction relative to the border of magnetic poles. This causes magnetic fluxes to flow in a different manner between the magnetic poles, which is not desirable in terms of occurrence of vibrations and noise.

In Japanese Patent Application Laid-Open No. 2000-217287, since the thickness of a bridge is thin in the vicinity of the border between the magnetic poles, the difference in thickness of the magnetic member in the radial direction between the border of the magnetic poles and the center of the magnetic poles is not reduced, which does not lead to sufficient reduction of torque ripple. In addition, a mode of depressing the outer surface of the rotor is also illustrated, however, this configuration is not desirable in terms of occurrence of windage loss or wind noise.

The techniques introduced in Japanese Patent Application Laid-Open Nos. 2002-44888 and 2004-180460 do not absolutely require the asymmetry of configuration of the rotor or do not need to depress the outer surface, however, the difference in thickness of the magnetic member in the radial direction between the border of the magnetic poles of the rotor and the center of magnetic poles is not reduced, which still does not lead to sufficient reduction of torque ripple.

SUMMARY OF THE INVENTION

The present invention has an object to avoid the absolute necessity of the asymmetry of configuration of a rotor, avoid the necessity to depress the outer surface and further reduce the torque ripple.

A first aspect of a magnetic member (1) according to this invention comprises: a periphery (10); a plurality of field magnet through-holes (2) disposed annularly in a circumferential direction, each having a pair of ends (21, 22) in the circumferential direction; and a pair of gaps (31, 32) provided at said pair of ends. Said gap (31) provided at one (21) of said ends of one of said field magnet through-holes: (i) extends toward the other one (22) of said ends passing on the side of said periphery with respect to the field magnet through-hole; (ii) has a first portion (311) spaced from said periphery at a constant first distance (L1) in the circumferential direction from the side of said other one of said ends and a second portion (312) whose distance from said periphery gradually increases while extending from said first portion toward another one of said field magnet through-holes adjacent on the side of said one of said ends; and (iii) further has a third portion (313) provided between said second portion and said one of said field magnet through-holes.

A second aspect of the magnetic member (1) according to this invention is the first aspect of the magnetic member according to this invention, in which, in one of said gaps, the width of said first portion (311; 321) in the radial direction gradually decreases with separation from said second portion (312; 322) in the circumferential direction, and an angle (θ3) of an end (311t; 321t) of said first portion on the opposite side of said second portion is selected to be between 15 and 25 degrees.

A third aspect of the magnetic member (1) according to this invention is the first aspect or second aspect of the magnetic member according to this invention, in which a space between the end (311t) of said first portion (311) of one (31) of a pair of gaps (31; 32) adjacent to each other respectively belonging to adjacent ones of said field magnet through-holes on the opposite side of said second portion (321) and the end (321t) of said first portion (321) of the other one (32) of said pair of said gaps on the opposite side of said second portion (322) extends with a first angle (θ1) in the circumferential direction as viewed from a center (Z0) of said periphery (10). A space between an end (311s) of said first portion (311) of said one (31) of said gaps on the side of said second portion (312) and an end (321s) of said first portion (321) of said other one (32) of said gaps extends with a second angle (θ2) in the circumferential direction as viewed from said center. Said second angle is selected to be between 1 and 16 degrees. Said first angle and said second angle are selected to fall within a range surrounded by curves L11, L12 and L20 shown in FIG. 6.

A fourth aspect of the magnetic member (1) according to this invention is any one of the first to third aspects of the magnetic member according to this invention, in which an end (312s; 322s) of said second portion (312; 322) on the side of said periphery on the side of said third portion (313; 323) are spaced from said periphery (10) at a distance (L2). Said first distance is selected to be 0.4 to 2.0 mm. Said second distance is larger by not less than 1.0 mm than 0.80 times said first distance, and selected to be equal to or smaller than a length obtained by adding 3.7 mm to 0.75 times said first distance.

A fifth aspect of the magnetic member (1) according to this invention is any one of the first to fourth aspects of the magnetic member according to this invention, in which the distance between said second portions (312; 322) and said periphery (10) changes linearly in the circumferential direction.

A sixth aspect of the magnetic member (1) according to this invention is any one of the first to fourth aspects of the magnetic member according to this invention, in which the distance between said second portion (312; 322) and said periphery (10) changes in a curve in the circumferential direction.

A seventh aspect of the magnetic member (1) according to this invention is any one of the first to fourth aspects of the magnetic member according to this invention, in which the distance between said second portion (312; 322) and said periphery (10) changes stepwise in the circumferential direction.

An eighth aspect of the magnetic member (1) according to this invention is any one of the first to seventh aspects of the magnetic member according to this invention, in which said third portions (313, 323) of a pair of said gaps (31; 32) adjacent to each other respectively belonging to adjacent ones of said field magnet through-holes are adjacent separately.

A ninth aspect of the magnetic member (1) according to this invention is any one of the first to seventh aspects of the magnetic member according to this invention, in which said third portions (313, 323) of a pair of said gaps (31; 32) adjacent to each other respectively belonging to adjacent ones of said field magnet through-holes are communicated with each other.

A tenth aspect of the magnetic member (1) according to this invention is any one of the first to ninth aspects of the magnetic member according to this invention, in which said third portions (313, 323) of said gaps and said field magnet through-holes (2) are communicated with each other.

An eleventh aspect of the magnetic member (1) according to this invention is the tenth aspect of the magnetic member according to this invention, in which said gaps (31, 32) further have recesses (310, 320) in said third portions (313, 323) on the side of said field magnet through-holes (2).

A twelfth aspect of the magnetic member (1) according to this invention is any one of the first to ninth aspects of the magnetic member according to this invention, in which said third portions (313, 323) of said gaps and said field magnet through-holes (2) are adjacent separately.

A rotor (100) according to this invention comprises: any one of the first to twelfth aspects of the magnetic member (1) according to this invention; and field magnets (6) inserted into said field magnet through-holes (2).

A motor according to this invention comprises: the rotor (100) according to this invention; and a stator (200) provided on the side of said periphery (10) with a predetermined space from said rotor.

According to the first to twelfth aspects of the magnetic member of the present invention, field magnets are inserted into field magnet through-holes in the magnetic member alone or in a stack of a plurality of them, and an embedded magnet type rotor can thereby be structured. In the vicinity of the border between the magnetic poles made by adjacent field magnets, the radial dimension of the magnetic member present between the second portion and periphery gradually increases while approaching the border in the circumferential direction. Accordingly, the radial dimension of the magnetic member at that border can be increased, so that the difference in thickness of the magnetic member in the radial direction between the border and the center of the magnetic poles can be reduced. With such configuration, the torque ripple can be reduced.

Further, since the gap provided at one end of a field magnet through-hole extends toward the other end passing on the side of the periphery with respect to the field magnet through-hole, the radial dimension of the magnetic member in this portion can be made smaller than the center of magnetic poles, so that the difference in thickness of the magnetic member in the radial direction between the border of magnetic poles and the magnetic poles can be reduced.

Therefore, the asymmetry of the configuration of a rotor is not absolutely necessary, and the outer surface does not need to be depressed, and the torque ripple can further be reduced.

Among others, according to the second aspect of the magnetic member of the present invention, the torque ripple of a motor to which the embedded magnet type rotor with the filed magnets inserted into the field magnet through-holes is applied can be reduced favorably.

Among others, according to the third aspect of the magnetic member of the present invention, the torque ripple of a 36-slot 6-pole motor can be reduced favorably applying the embedded magnet type rotor with the filed magnets inserted into the field magnet through-holes to that motor.

Among others, according to the fourth aspect of the magnetic member of the present invention, the torque ripple of a motor to which the embedded magnet type rotor with the filed magnets inserted into the field magnet through-holes is applied can be reduced favorably.

Among others, according to the eighth aspect of the magnetic member of the present invention, the mechanical strength in the vicinity where the gaps are provided can be increased.

Among others, the eleventh aspect of the magnetic member of the present invention facilitates positioning of the field magnets inserted into the field magnet through-holes.

Among others, according to the twelfth aspect of the magnetic member of the present invention, the mechanical strength in the vicinity where the gaps are provided can be increased.

According to the rotor of the present invention, in the vicinity of the border between the magnetic poles made by adjacent field magnets, the radial dimension of the magnetic member present between the second portions and periphery gradually increases while approaching the border in the circumferential direction. Accordingly, the radial dimension of the magnetic member at that border can be increased, so that the difference in thickness of the magnetic member in the radial direction between the border and the center of the magnetic poles can be reduced. With such configuration, the torque ripple can be reduced.

Further, since the gap provided at one end of a field magnet through-hole extends toward the other end passing on the side of the periphery with respect to the field magnet through-hole, the radial dimension of the magnetic member in this portion can be made smaller than the center of magnetic poles, so that the difference in thickness of the magnetic member in the radial direction at the border of magnetic poles can be reduced.

According to the motor of the present invention, the torque ripple is reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is a simulation graph showing dependence of torque ripple rate on an angle θ3.

FIG. 7 is a simulation graph showing dependence of torque ripple rate on angles θ1 and θ2.

DETAILED DESCRIPTION OF THE INVENTION

First Embodiment

Description of Basic Configuration

Figure 1:
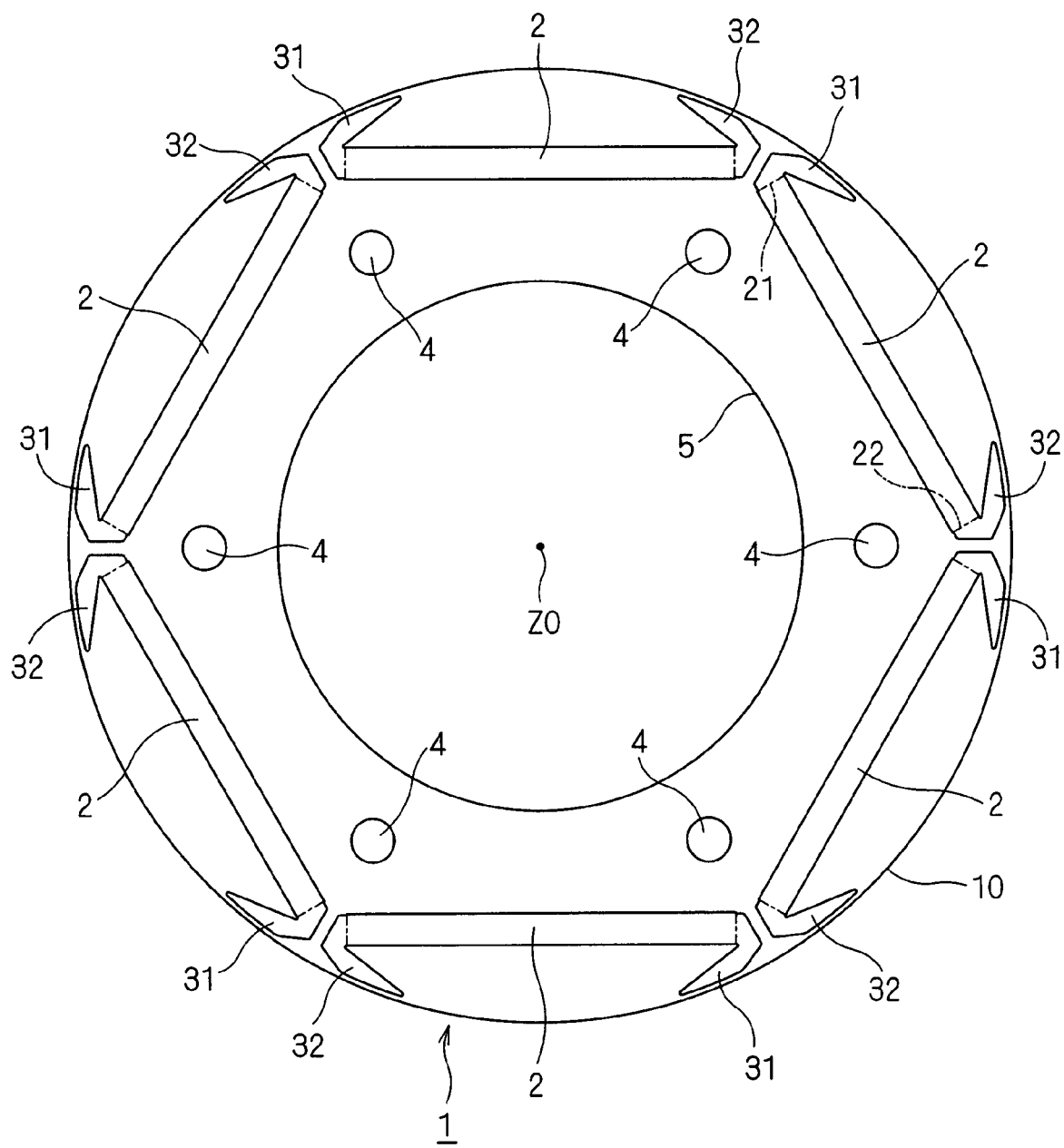
FIG. 1 is a plan view showing the structure of a magnetic member according to a first embodiment of the present invention.

FIG. 1 is a plan view showing the structure of a magnetic member 1 according to a first embodiment of the present invention. The magnetic member 1 can contribute to an embedded magnet type rotor, as will be described later. The magnetic member 1 may extend in the direction perpendicular to the sheet of drawing, or may be thin in the direction perpendicular to the sheet of drawing. In the former case, it may be formed of, for example, dust core to be employed as the core of a rotor. In the latter case, it may be formed employing, for example, steel sheets, which are stacked one upon another to be employed as the core of a rotor. In that case, FIG. 1 can be understood as a sectional view of that core. The center Z0 corresponds to a rotation axis of the core of the rotor.

The magnetic member 1 has a periphery 10 showing an annular shape, and the case in which the periphery 10 shows a circle as an outer periphery is illustrated here. However, it does not necessarily need to be a perfect circle, and design modifications may be made according to necessity. In the case where the above-described rotor is obtained, a stator which is an armature can be provided to oppose to the periphery 10 of that rotor to constitute a motor. In the case where the periphery 10 is provided on the inner peripheral side, the stator will be disposed on the inner side of that rotor (illustration is omitted).

The magnetic member 1 is provided with a plurality of, herein, six field magnet through-holes 2 disposed annularly in the circumferential direction, each having a pair of ends 21 and 22 in the circumferential direction. In addition, the ends 21 and 22 in each of the field magnet through-holes 2 are each provided with gaps 31 and 32.

In the case where a plurality of magnetic members 1 are stacked, it is desirable that fastening holes 4 through which fastening members are to be inserted be provided. While illustrated in the following description, they are not essential components, and are not necessary, for example, in the case of connecting the magnetic members 1 to each other by swaging or in the case of forming the magnetic member 1 as the core of a rotor made of dust core.

Further, the case in which a shaft hole 5 through which a shaft of the rotor is to be inserted is provided at the center of the magnetic member 1 is illustrated. This is not an essential component either, and is not necessary, for example, in the case of providing an end plate at the end in the axial direction and providing a rotation shaft on that end plate.

Figure 2:
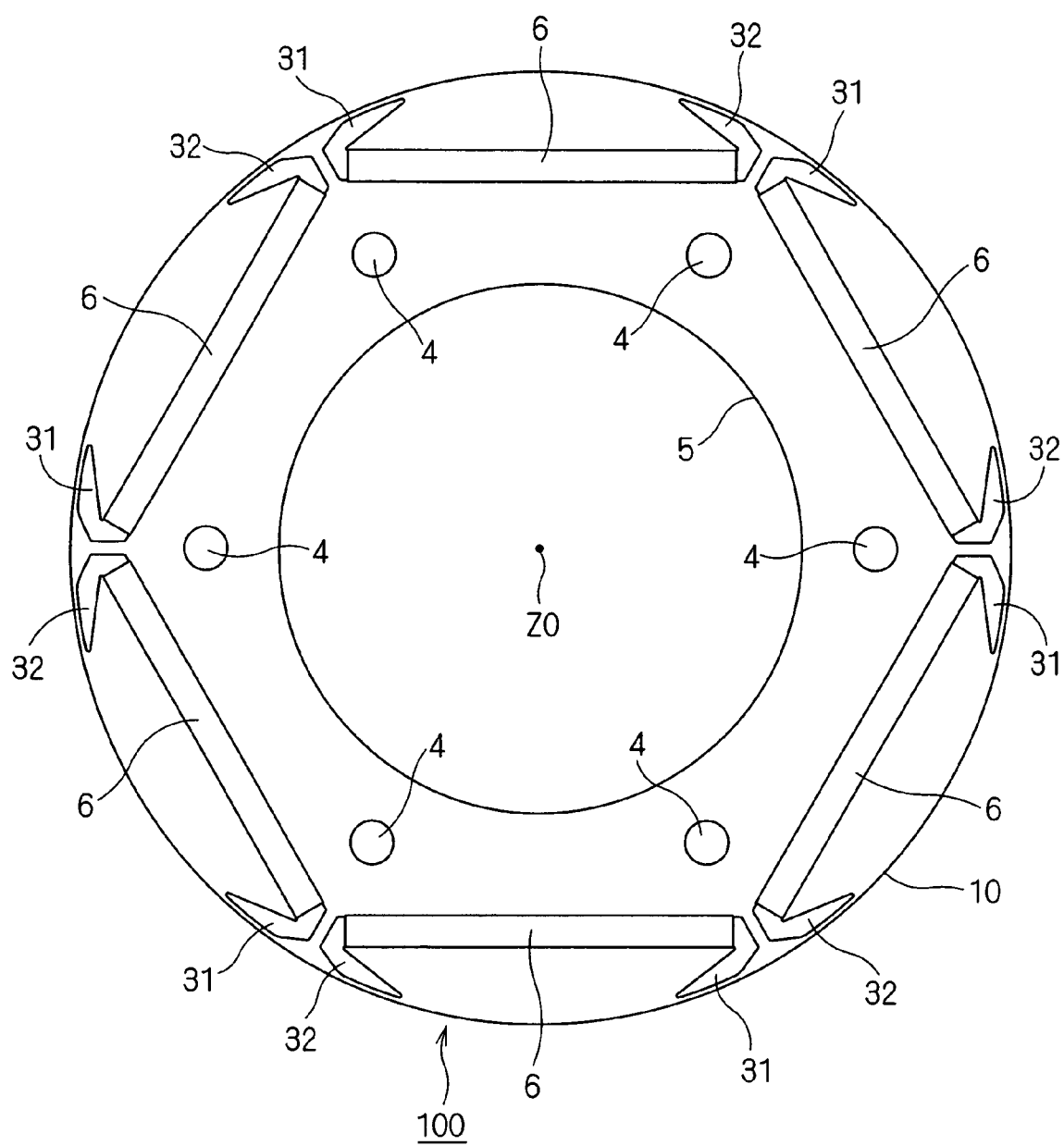
FIG. 2 is a sectional view showing the structure of a rotor according to the first embodiment of the present invention.

FIG. 2 is a sectional view showing the structure of a rotor 100, and shows a cross section perpendicular to the rotation axis Z0. The rotor 100 is obtained by inserting field magnets 6 into the field magnet through-holes 2 of the magnetic member 1 shown in FIG. 1 or a stack of a plurality of them.

The field magnets 6 each exhibit pole faces different from each other on the side of the periphery 10 (herein, on the outer peripheral side) and on the opposite side (herein, on the inner peripheral side). The pole pair number of the rotor 100 illustrated here is 3, and adjacent ones of the field magnets 6 exhibit pole faces different from each other toward the periphery 10.

Figure 3:
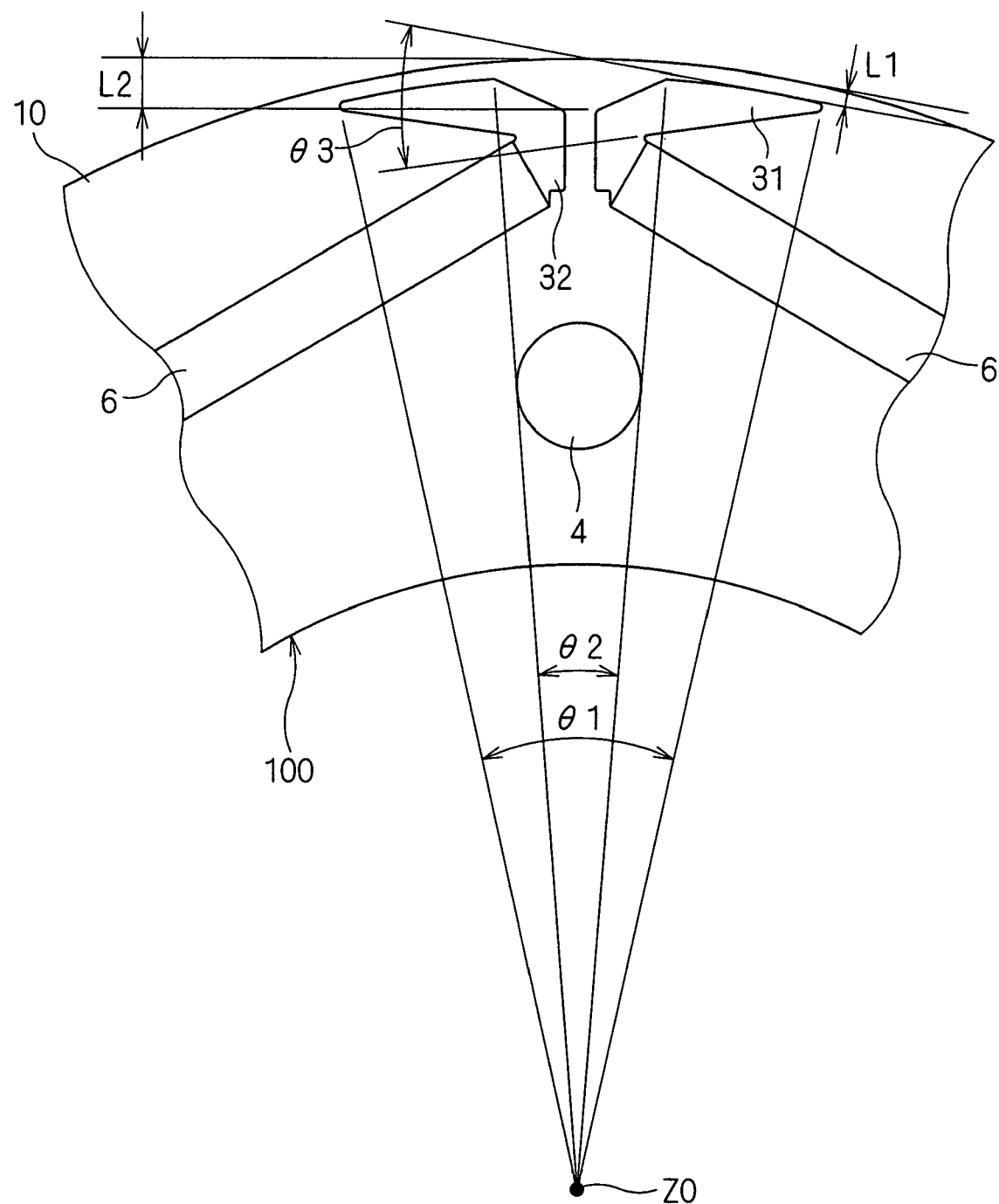
FIGS. 3 and 4 is a are sectional views partially showing the structure of the rotor according to the first embodiment of the present invention.
Figure 4:
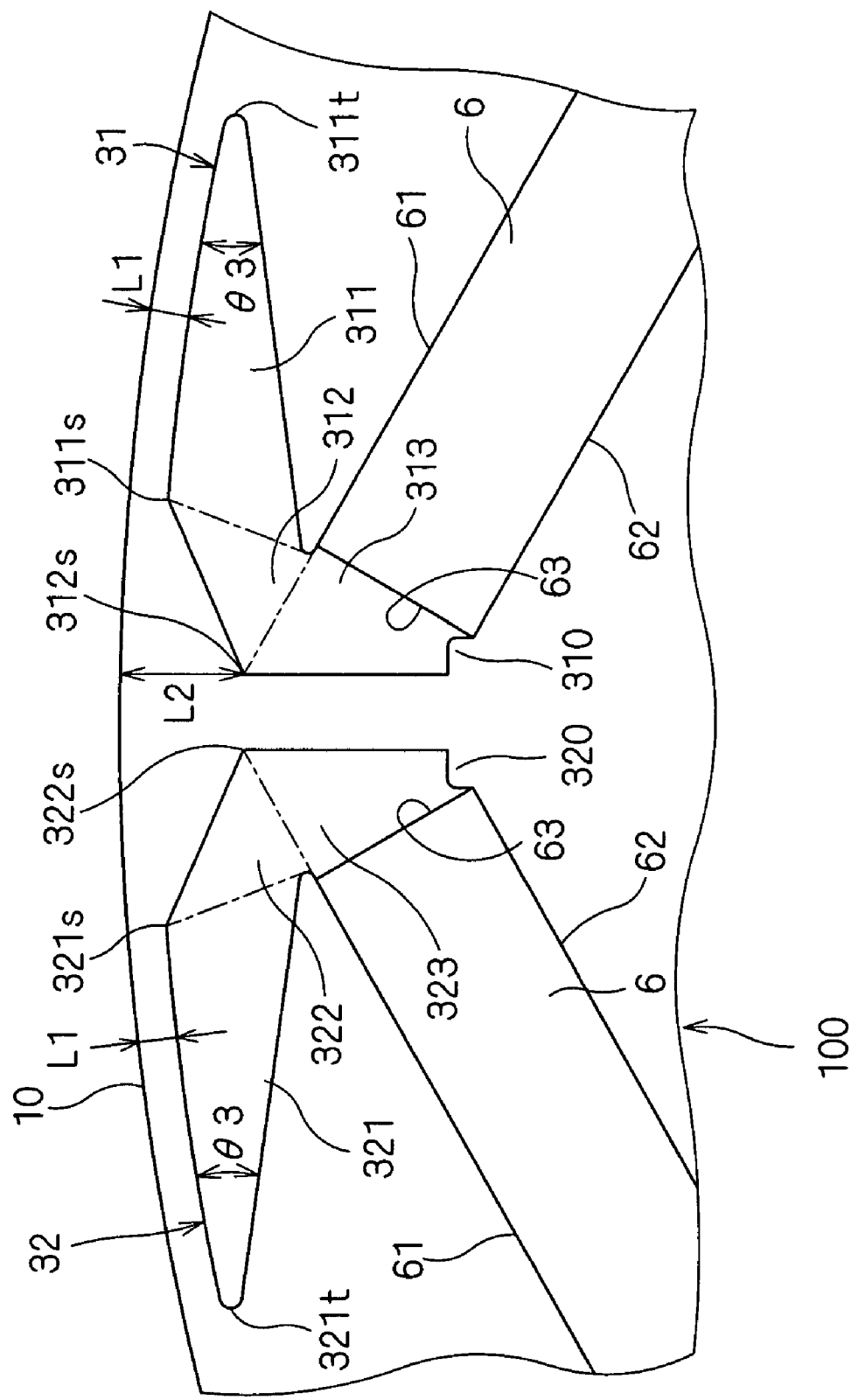

FIG. 3 is a sectional view enlargedly showing the vicinity of the border between magnetic poles of the rotor 100, and FIG. 4 is a sectional view further enlargedly showing the vicinity of the gaps 31 and 32 adjacent to each other in the vicinity of the border between magnetic poles.

The gap 31 of a field magnet through-hole 2 extends toward the end 22 of the same field magnet through-hole 2 passing on the side of the periphery 10 with respect to the field magnet through-hole 2 having the end 21 on which the gap 31 is provided (in the case where field magnets 6 are inserted into field magnet through-holes 2, a field magnet 6 inserted into the field magnet through-hole 2 provided with the gap 31 noted now; the end 21 corresponds to an end 63 of the field magnet 6 on the right side in FIG. 4 other than pole faces 61 and 62).

Referring to FIG. 4 as well, the gap 31 has a first portion 311, a second portion 312 and a third portion 313. The first portion 311 is spaced from the periphery 10 at a constant distance L1 in the circumferential direction from the side of the end 22 of the field magnet through-hole 2 having the end 21 at which the gap 31 to which the first portion 311 belongs is provided.

The distance between the second portion 312 and periphery 10 gradually increases from the first portion 311 toward another field magnet through-hole 2 adjacent on the side of the end 21 (on the side of the end 63 of the field magnet 6 on the right side in FIG. 4). The third portion 313 is provided between the second portion 312 and field magnet through-hole 2. An end 312s of the second portion 312 on the side of the periphery 10 on the side of the third portion 313 is spaced from the periphery 10 at a distance L2.

Similarly, the gap 32 of a field magnet through-hole 2 extends toward the end 21 of the same field magnet through-hole 2 passing on the side of the periphery 10 with respect to the field magnet through-hole 2 having the end 22 on which the gap 32 is provided (in the case where field magnets 6 are inserted into field magnet through-holes 2, a field magnet 6 inserted into the field magnet through-hole 2 provided with the gap 32 noted now; the end 22 corresponds to an end 63 of the field magnet 6 on the left side in FIG. 4 other than pole faces 61 and 62).

The gap 32 has a first portion 321, a second portion 322 and a third portion 323. The first portion 321 is spaced from the periphery 10 at the constant distance L1 in the circumferential direction from the side of the end 21 of the field magnet through-hole 2 having the end 22 at which the gap 32 to which the first portion 321 belongs is provided.

The distance between the second portion 322 and periphery 10 gradually increases from the first portion 321 toward another field magnet through-hole 2 adjacent on the side of the end 22 (on the side of the end 63 of the field magnet 6 on the left side in FIG. 4). The third portion 323 is provided between the second portion 322 and field magnet through-hole 2. An end 322s of the second portion 322 on the side of the periphery 10 on the side of the third portion 323 is spaced from the periphery 10 at the distance L2.

The gaps 31 and 32 have recesses 310 and 320 in the third portions 313 and 323, respectively, on the side of the field magnet through-holes 2. This facilitates positioning of the field magnets 6 inserted into the field magnet through-holes 2.

In this manner, the field magnets 6 are inserted into the field magnet through-holes 2 in the magnetic member 1 alone or in a stack of a plurality of them, and the embedded magnet type rotor 100 can thereby be structured.

Figure 5:
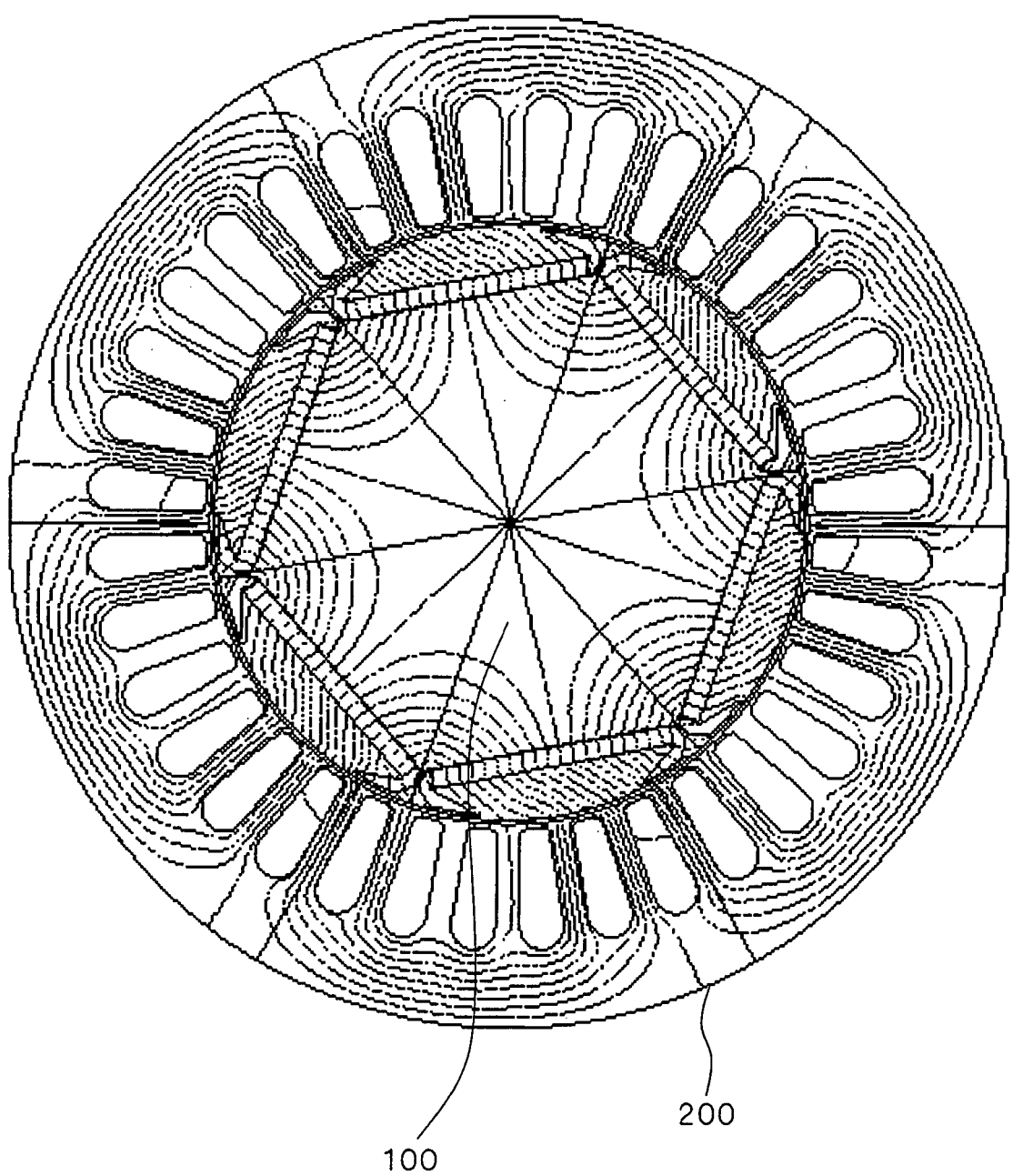
FIG. 5 is a sectional view showing a sectional configuration of a motor provided with the rotor and stator core according to the first embodiment of the present invention.

FIG. 5 is a sectional view showing a sectional configuration of a motor provided with the rotor 100 and a 36-slot 6-pole stator core 200. The borders between magnetic poles of the rotor 100 and stator 200 are indicated by six straight lines each extending in the radial direction, and the distribution of magnetic fluxes produced from the rotor 100 are also shown. FIG. 5 shows the case of inserting a rotation shaft made of a magnetic material into a hole at the center of the rotor 100.

In the vicinity of the border of magnetic poles made by adjacent field magnets 6, the radial dimension of the magnetic member 1 present between the second portions 312, 322 and periphery 10 gradually increases from the distance L1 to distance L2 while approaching the border in the circumferential direction. Accordingly, the radial dimension of the magnetic member 1 at that border can be increased, so that the difference in thickness of the magnetic member 1 in the radial direction between the border and center of the magnetic poles can be reduced. With such configuration, the torque ripple can be reduced.

Further, since the gaps 31 and 32 respectively provided at the ends 21 and 22 of each field magnet through-hole 2 respectively extend toward the ends 22 and 21 passing on the side of the periphery 10 with respect to the field magnet through-hole 2, the radial dimension of the magnetic member 1 in this portion can be made smaller than the center of magnetic poles, so that the difference in thickness of the magnetic member 1 in the radial direction at the border of magnetic poles can be reduced.

The present invention greatly differs from Japanese Patent Application Laid-Open Nos. 2002-44888 and 2004-180460 in that the distance L2 is greater than distance L1, but enjoys the advantages of Japanese Patent Application Laid-Open Nos. 2002-44888 and 2004-180460, that is, avoiding the absolute necessity of the asymmetry of configuration of the rotor, avoiding the necessity to depress the outer surface and improving the torque ripple. Further, these characteristics lead to further improvement in torque ripple resulting from the aforementioned specific effect, that is, reduction of the difference in thickness of the magnetic member 1 in the radial direction between the border and center of the magnetic poles.

<Preferable Configuration>

Now, more preferable configuration of the gaps 31 and 32 will be described. Referring to FIG. 4, in the gap 31, the width of the first portion 311 in the radial direction gradually decreases with separation from the second portion 312 in the circumferential direction, and an end 311t of the first portion 311 on the opposite side of the second portion 312 forms an angle $\theta 3$. Similarly, in the gap 32, the width of the first portion 321 in the radial direction gradually decreases with separation from the second portion 322 in the circumferential direction, and an end 321t of the first portion 321 on the opposite side of the second portion 322 forms the angle $\theta 3$.

A space between the end 311t of the first portion 311 of the gap 31 and the end 321t of the first portion 321 of the gap 32 most closely adjacent to that gap 31 extends with an angle $\theta 1$ in the circumferential direction as viewed from the central axis Z0 which is the center of the periphery 10 (cf. FIGS. 3 and 4).

Further, a space between an end 311s of the first portion 311 of the gap 31 on the side of the second portion 312 on the side of the periphery 10 and an end 321s of the first portion 321 of the gap 32 most closely adjacent to that gap 31 on the side of the second portion 322 on the side of the periphery 10 extends with an angle $\theta 2$ in the circumferential direction as viewed from the central axis Z0 (cf. FIGS. 3 and 4).

FIG. 6 is a simulation graph showing the dependence of the torque ripple rate (a percentage of difference between maximum value and minimum value of torque with respect to the torque average value) of the motor provided with the rotor 100 and stator 200 on the angle $\theta 3$ in the case where L1=0.7 mm, L2=3.2 mm, $\theta 1 = 25°$, and $\theta 2 = 7.5°$. The torque ripple rate can be suppressed at 10% or below where $\theta 3 = 15$ to $25°$. The case in which the magnetic member serving as a rib between the third portions 313 and 323 most closely adjacent to each other extends at 1.1° with respect to the central axis Z0 is taken as an example.

It is noted that, the torque ripple rate was 20.8% under the conditions where L1=L2=0.7 mm, $\theta 1 = 25°$, and $\theta 3 = 22°$ in order to make it close to the technique described in Japanese Patent Application Laid-Open No. 2004-180460. Since L1=L2, there exists no region whose distance from the periphery 10 gradually varying in the circumferential direction like the second portion, and the angle $\theta 2$ cannot be defined. In this case, the gaps 31 and 32 vary with the angle $\theta 1$ while interposing the magnetic member serving as a rib from both sides thereof and keeping the distance L1 from the periphery 10.

In the contrary, the torque ripple rate decreased down to 8.1% in the case of increasing L2 up to 3.2 mm (following which θ2=7.5°) while keeping the values of L1, θ1 and θ3 not changed. It is understood that the torque ripple rate is thereby improved in the present embodiment more than in the technique described in Japanese Patent Application Laid-Open No. 2004-180460.

FIG. 7 is a simulation graph showing the dependence of torque ripple rate on the angles θ1 and θ2, and the torque ripple rate is indicated by contour lines. Each two-digit value in FIG. 7 is a value of torque ripple rate expressed as a percentage, and a curve shown beside it connects the coordinates of the angles θ1 and θ2 giving that torque ripple rate. The short line inside the contour line showing that the torque ripple rate is 10% indicates that the region including that short line has a smaller torque ripple rate. That is, it shows that there exists no region whose torque ripple rate is higher than 10% inside the contour line showing that the torque ripple rate is 10%.

The dash-double-dot line indicates the range of simulation for obtaining the graph of FIG. 7. In addition, settings were made such that L1=0.7 mm and L2=3.2 mm, similarly to FIG. 6.

As understood from FIG. 3, merely increasing the angle θ1 decreases the angle θ3. Therefore, in the simulation, the angle θ3 is kept in a range (15 to 25°) that makes the torque ripple rate favorable in FIG. 6. Specifically, θ3=18.4° when θ1=40°; θ3=19.9° when θ1=30°; θ3=22.2° when θ1=25°; θ3=19.8 to 22.0° when θ1=20°; and θ3=17.8 to 20.1° when θ1=15. In addition, θ3=18.4 to 19.9° when θ1=35°.

As described above, the case in which L1=L2=0.7 mm, θ1=25°, and θ3=22° is close to the technique described in Japanese Patent Application Laid-Open No. 2004-180460, where the torque ripple rate was 20.8%. The conditions of L1, θ1 and θ3 at this time fall within the range showing the best results in FIG. 7 (which lies within the contour line showing that the torque ripple rate is 10%). Thus, employed as the condition for obtaining suitable values for θ1 and θ2 is that the torque ripple rate is lower than 20.8%, practically, it is 20% or lower by approximation for simplicity.

The upper limit of θ1 is defined by curves L11, L12, and the lower limit is defined by a curve L20, respectively. The upper and lower limits of θ2 are 16° and 1°, respectively, which were determined by the border of simulations.

The curve L11 is part of one having larger θ1 of curves where the torque ripple rate is 20%. The left end of the curve L11 is determined by the coordinates of θ1=33° and θ2=1°, and the right end is determined by the coordinates of θ1=31 and θ2=14°. The curve L12 has its left end determined by the coordinates of θ1=31° and θ2=14°, and is connected with the curve L11 here. Further, the curve L12 corresponds to θ1=31° where θ2=14 to 15°, and where θ2=15 to 16°, corresponds to the border of simulation having larger θ1.

The curve L12 is present between the curves L11, L20 showing the torque ripple rate of 20% and a curve showing the torque ripple rate of 15%, and there is no curve showing the torque ripple rate of 25% between the curves L11 and L12.

From the foregoing description, it is understood that the torque ripple rate can be made lower than 20% by designating as θ1=1 to 16° and θ1 and θ2 as falling within the range surrounded by the curves L11, L12 and L20 shown in FIG. 6, that is, the torque ripple rate is improved in the present embodiment more than in the technique described in Japanese Patent Application Laid-Open No. 2004-180460.

The condition employed in the simulation graph shown in FIG. 6 that θ1=25° and θ2=7.5° falls within the range showing the best results in FIG. 7.

Figure 8:
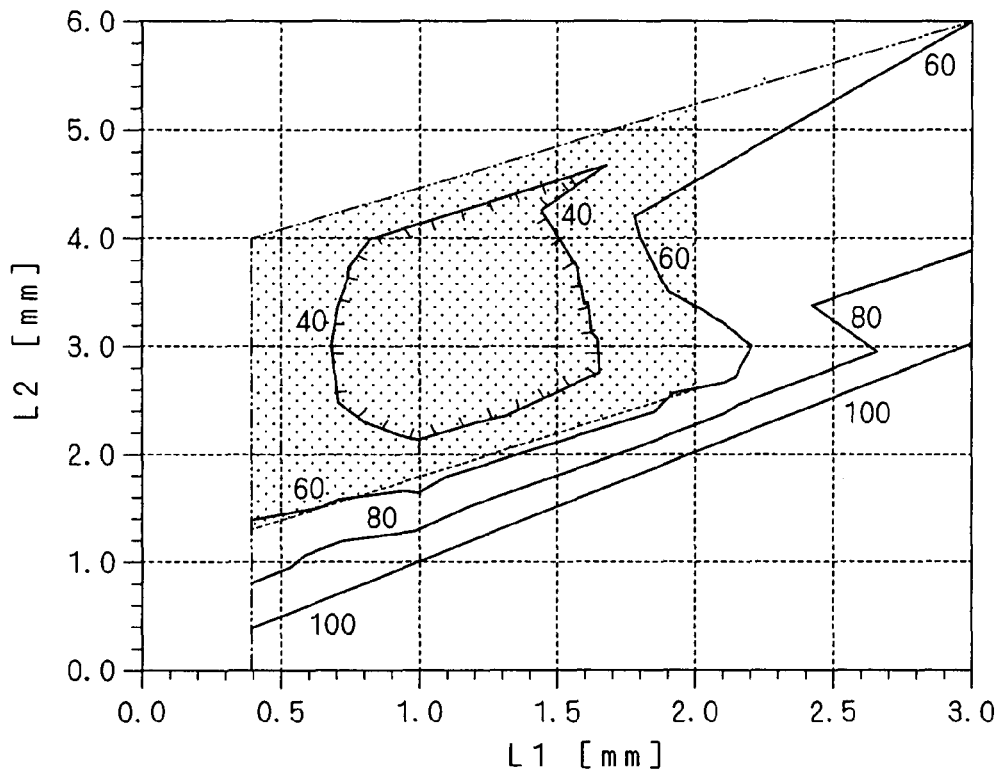
FIG. 8 is a simulation graph showing the manner in which the torque ripple rate decreases depending on distances L1 and L2.

FIG. 8 is a simulation graph showing the manner in which the torque ripple rate of the motor provided with the rotor 100 and stator 200 decreases depending on distances L1 and L2.

Each two-digit value in FIG. 8 is a value expressing the rate of decrease of the torque ripple rate as a percentage as compared to the case where L1=L2, and a curve shown beside it connects the coordinates of the distances L1 and L2 giving that rate of decrease. The short line inside the contour line showing that the rate of decrease is 40% indicates that the region including that short line has a lower rate of decrease. That is, it shows that there exists no region whose rate of decrease is higher than 40% inside the contour line showing that the rate of decrease is 40%.

The dash-double-dot line indicates the range of simulation for obtaining the graph of FIG. 8. In addition, θ=24°, θ2=7.5° (not defined in the case where L1=L2) and θ3=21°. For these angles θ1, θ2 and θ3, nearly optimum values are employed in view of FIGS. 6 and 7.

In consideration of the mechanical strength of the rotor 100, it is not desirable to make the distance L1 small. On the other hand, in consideration of preventing short circuiting of magnetic flux between the magnetic poles of field magnets 6, being thick is not desirable. In these points of view, it is desirable that the distance L1 be selected to be 0.4 to 2.0 mm. In the vicinity where the distance L1 takes the upper limit of 2.0 mm, it is desirable to select the distance L2 to be 0.80·L1+1.0 to 0.75·L1+3.7 (mm) in view of that the dependence of the rate of decrease on the distance L2 is small where the distance L2 is approximately 2.6 to 4.5 mm and in view of the range of simulation. The torque ripple rate can thereby be reduced by approximately 40% or more as compared to the case where L1=L2. Such desirable range is shown by hatching in FIG. 8.

<Consideration of Reasons why the Effects are Obtained>

Figure 9:
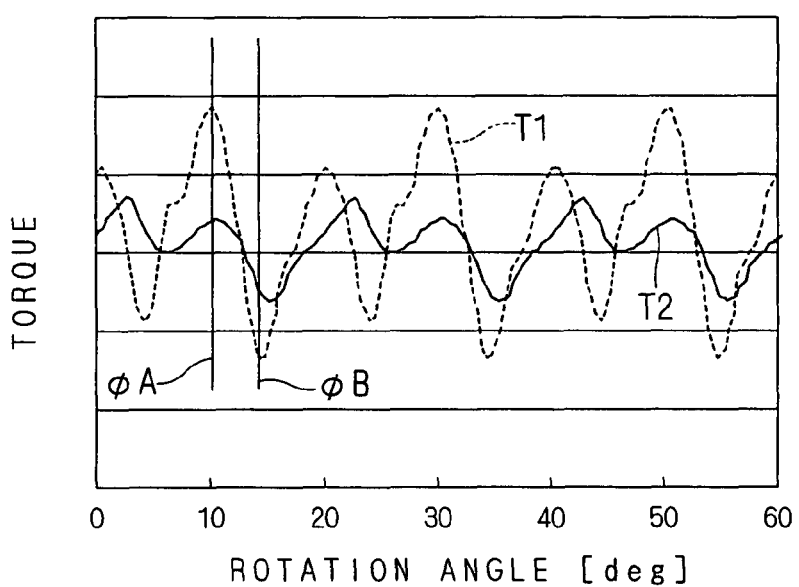
FIG. 9 is a graph showing the torque.

Next, the consideration of reasons why the torque ripple rate is reduced will be described briefly. FIG. 9 is a graph showing the torque. A curve T1 is a graph showing the torque of a motor using a rotor employing L1=L2=0.7 mm, θ1=25° and θ3=22° and the 36-slot 6-pole stator 200. A curve T2 shows the torque of a motor according to the present embodiment, and settings are made such that L1=0.7 mm, L2=3.2 mm, θ1=25°, θ2=7.5° and θ3=22°. An average torque of their torques are set equal.

However, FIG. 9 only illustrates one magnetic pole, that is, a gap of 360°/6=60° as a mechanical angle. The rotation angle in the state where the border of magnetic poles of the rotor and the border of magnetic poles of the stator match shall be 0° (see the lines extending in the radial direction in FIG. 5).

The curve T2 has less variations, that is, the torque ripple rate is lower than in the curve T1. More specifically, the curve T1 takes its maximum value and minimum value at the rotation angles φA and φB, respectively. The curve T2 also takes its maximum value and minimum value in the vicinity of the rotation angle φA and φB, respectively. However, the maximum value of the curve T2 is smaller than the maximum value of the curve T1, and the minimum value of the curve T2 is larger than the minimum value of the curve T1.

Figure 10:
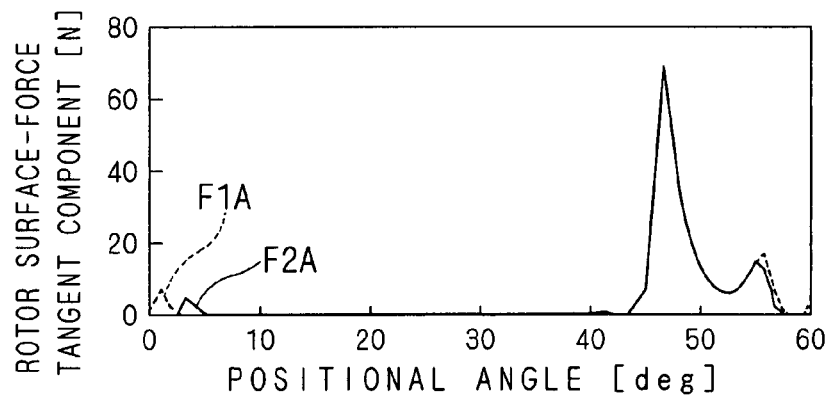
FIGS. 10 to 12 is a are graphs each showing the relationship of rotor surface-force tangent component at a rotation angle φA.
Figure 11:
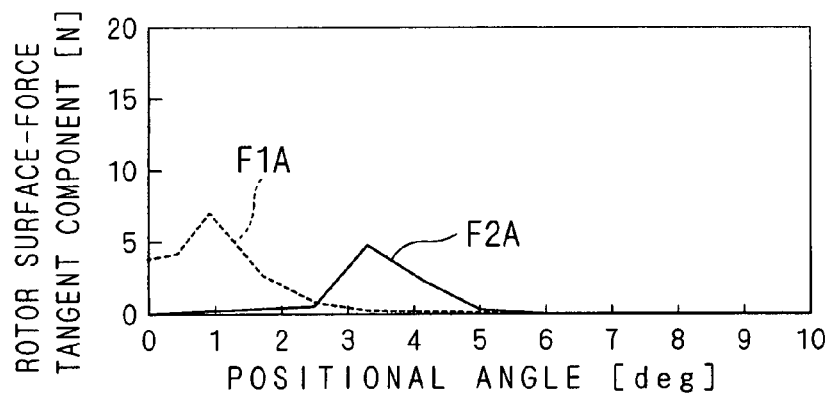
Figure 12:
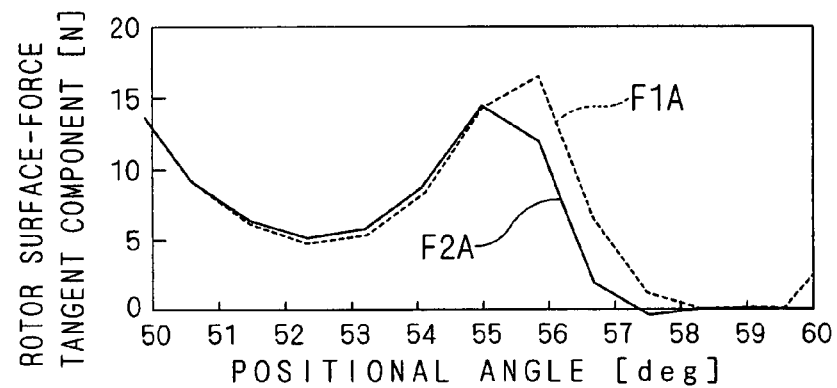
Figure 15:
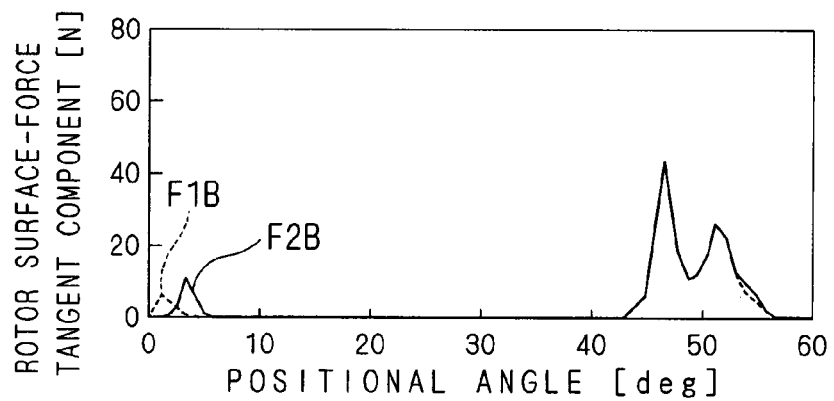
FIGS. 15 to 17 are graphs each showing the relationship of rotor surface-force tangent component at a rotation angle φB.
Figure 16:
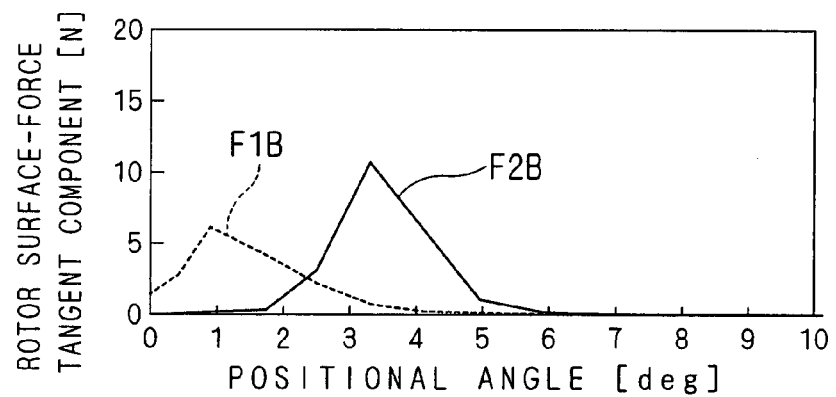
Figure 17:
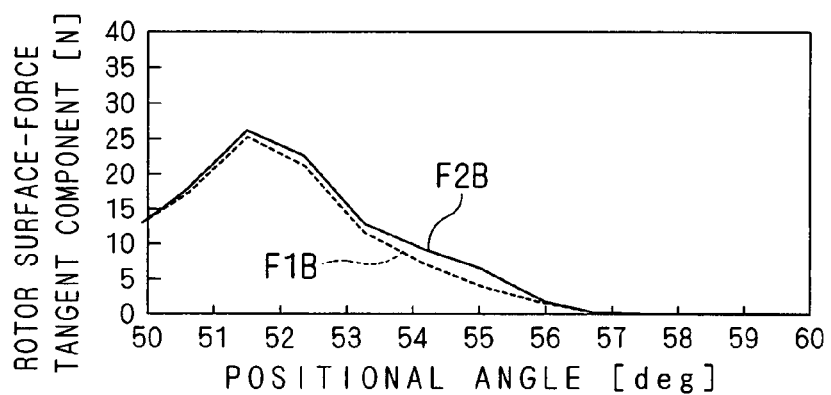

To study this in more detail, the relationship between a tangent component of electromagnetic force working on the surface of a rotor (called "a rotor surface-force tangent component") and a positional angle of the rotor (making the magnetic pole border 0°) was graphed. FIGS. 10 to 12 show the relationship at the rotation angle φA, and FIGS. 15 to 17 show the relationship at the rotation angle φB.

FIG. 10 shows a rotor surface-force tangent component for one magnetic pole (here, 360°/3/2=60° since the pole pair number of the rotor is 3), FIG. 11 shows a rotor surface-force tangent component in the vicinity of 0 to 10°, and FIG. 12 shows a rotor surface-force tangent component in the vicinity of 50 to 60°. Curves F1A and F2A indicate the rotor surface-force tangent component in motors giving the curves T1 and T2 in FIG. 9, respectively.

At the rotation angle φA, the curves F1A and F2A are both at approximately zero in the vicinity of the positional angle of 7 to 40°, and the two motors are little different in the rotor surface-force tangent component. However, at the positional angles shown in FIGS. 11 and 12, the curve F2A has a smaller rotor surface-force tangent component than the curve F1A. The tendency is particularly significant in the region whose positional angle is 55 to 58° as shown in FIG. 12.

Figure 13:
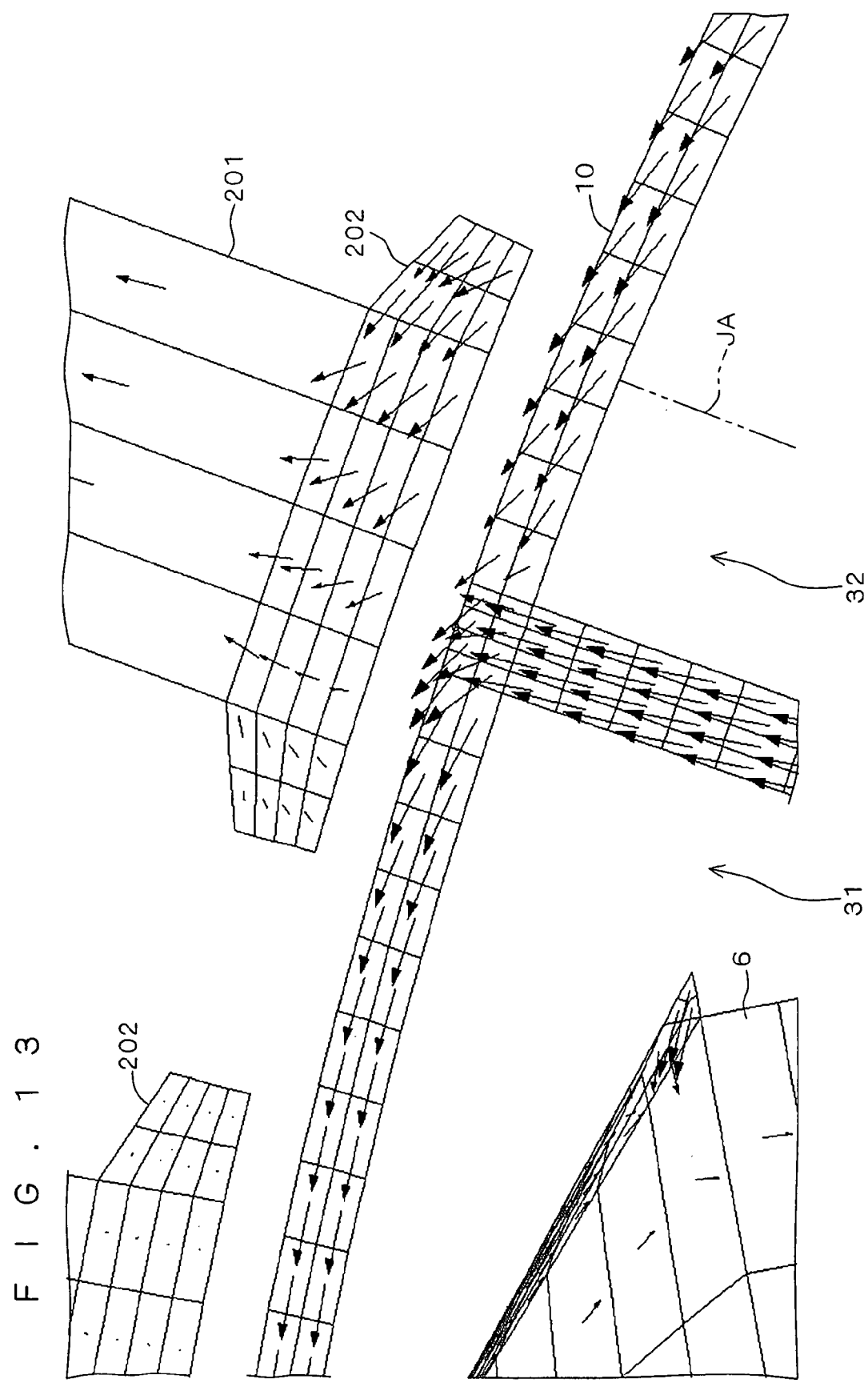
FIGS. 13 and 14 are sectional views each showing a simulation indicating flux vectors in the rotor and stator.
Figure 14:
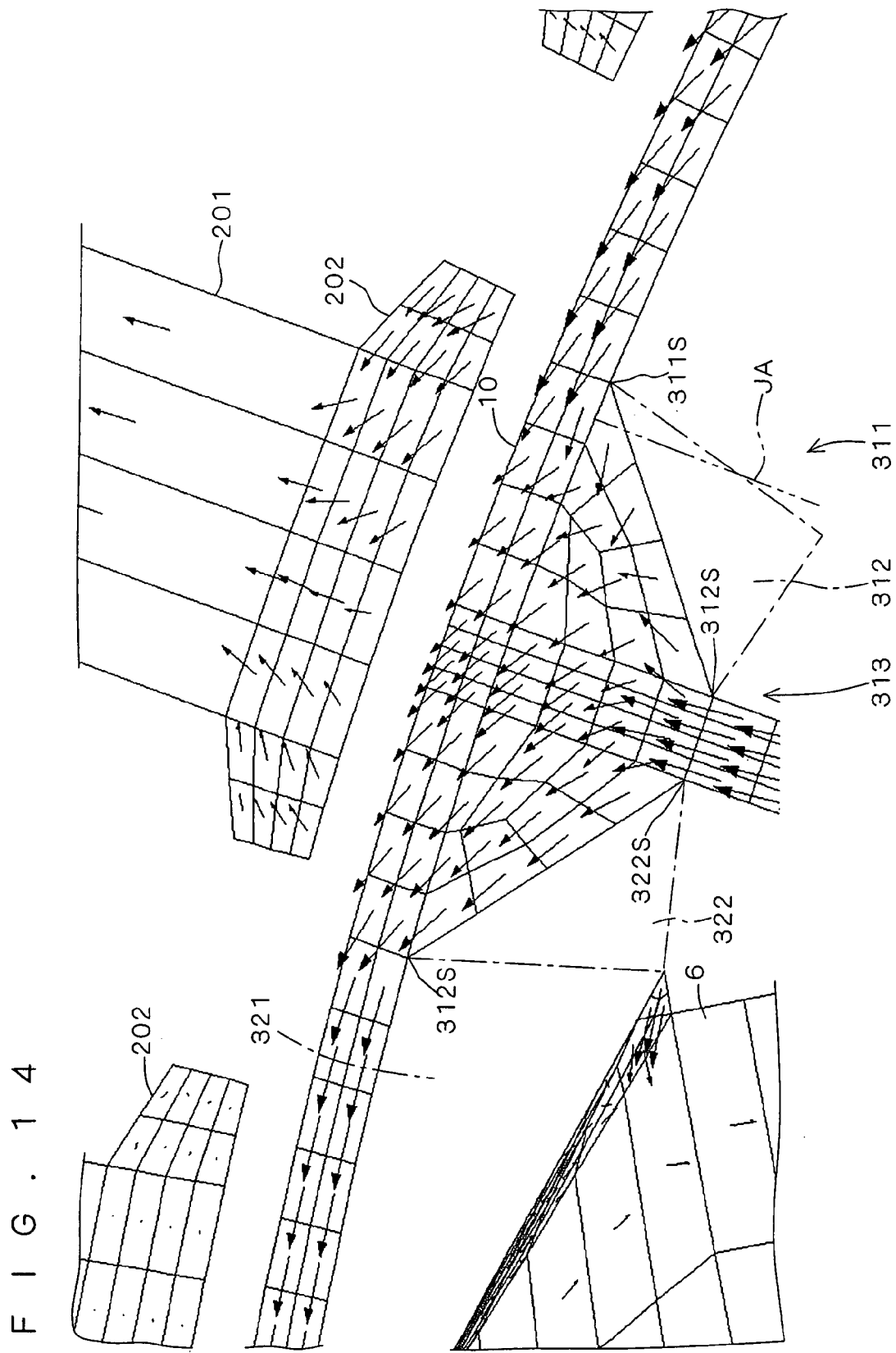

FIGS. 13 and 14 show the results of simulations indicating flux vectors in a rotor and a stator, and correspond to sectional views. To perform simulations, the rotor and stator are subdivided into a plurality of elements, and the starting point of a flux vector is disposed at the center of each element. A teeth section 201 of the stator has a widened portion 202 on the side of the rotor.

FIG. 13 shows the case in which the structure of L1=L2 is employed for the rotor, and FIG. 14 shows the case in which the structure of L2>L1 (i.e., the rotor according to the present invention) is employed. In both FIGS. 13 and 14, a dash-and-dot line JA in the radial direction shows the position where the positional angle is approximately 56°.

In FIG. 14, as compared to FIG. 13, the flux vector in the position indicated by the dash-and-dot line JA in the radial direction has a smaller radial component, although the circumferential component is little different. This is considered because setting L2>L1 increases the thickness of the magnetic member in the circumferential direction in the same direction as the direction that the flux vector at that position is directed, in other words, the amount of magnetic member between the second portion 312 and periphery 10 is greater than in the structure shown in FIG. 13. That is, in the structure shown in FIG. 14, it is considered because the flux vector at the position in the circumferential direction indicated by the dash-and-dot line JA is more likely to be directed to the opposite side of the widened portion 202 of the stator than in the structure shown in FIG. 13.

The rotor surface-force tangent component is proportional to the product of the circumferential component and radial component of a flux vector. Accordingly, the decrease in the radial component while the circumferential component of the flux vector hardly changes decreases the rotor surface-force tangent component. This is considered the reason why the curve F2A appearing in FIG. 12 is smaller than the curve F1A.

FIG. 15 shows a rotor surface-force tangent component for one magnetic pole (60°), FIG. 16 shows a rotor surface-force tangent component in the vicinity of 0 to 10°, and FIG. 17 shows a rotor surface-force tangent component in the vicinity of 50 to 60°. Curves F1B and F2B indicate the rotor surface-force tangent component in motors giving the curves T1 and T2 in FIG. 9, respectively.

At the rotation angle φB, the curves F1B and F2B are both at approximately zero in the vicinity of the positional angle of 7 to 42°, and the two motors are little different in the rotor surface-force tangent component. However, at the positional angles shown in FIGS. 16 and 17, the curve F2B has a larger rotor surface-force tangent component than in the curve F1B. The tendency is particularly significant in the region whose positional angle is 0 to 5° as shown in FIG. 16.

Figure 18:
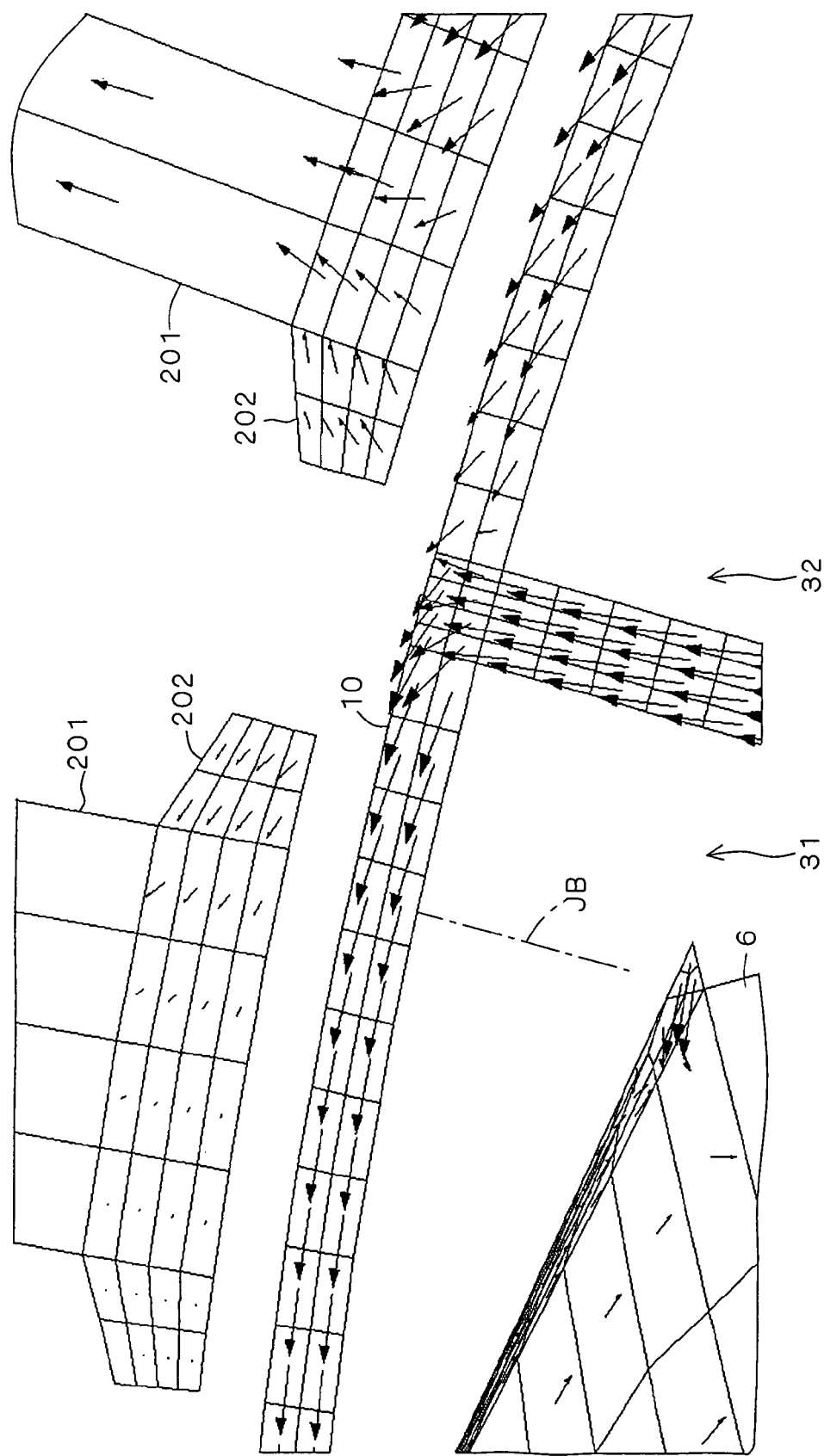
FIGS. 18 and 19 are sectional views each showing a simulation indicating flux vectors in a rotor and a stator.
Figure 19:
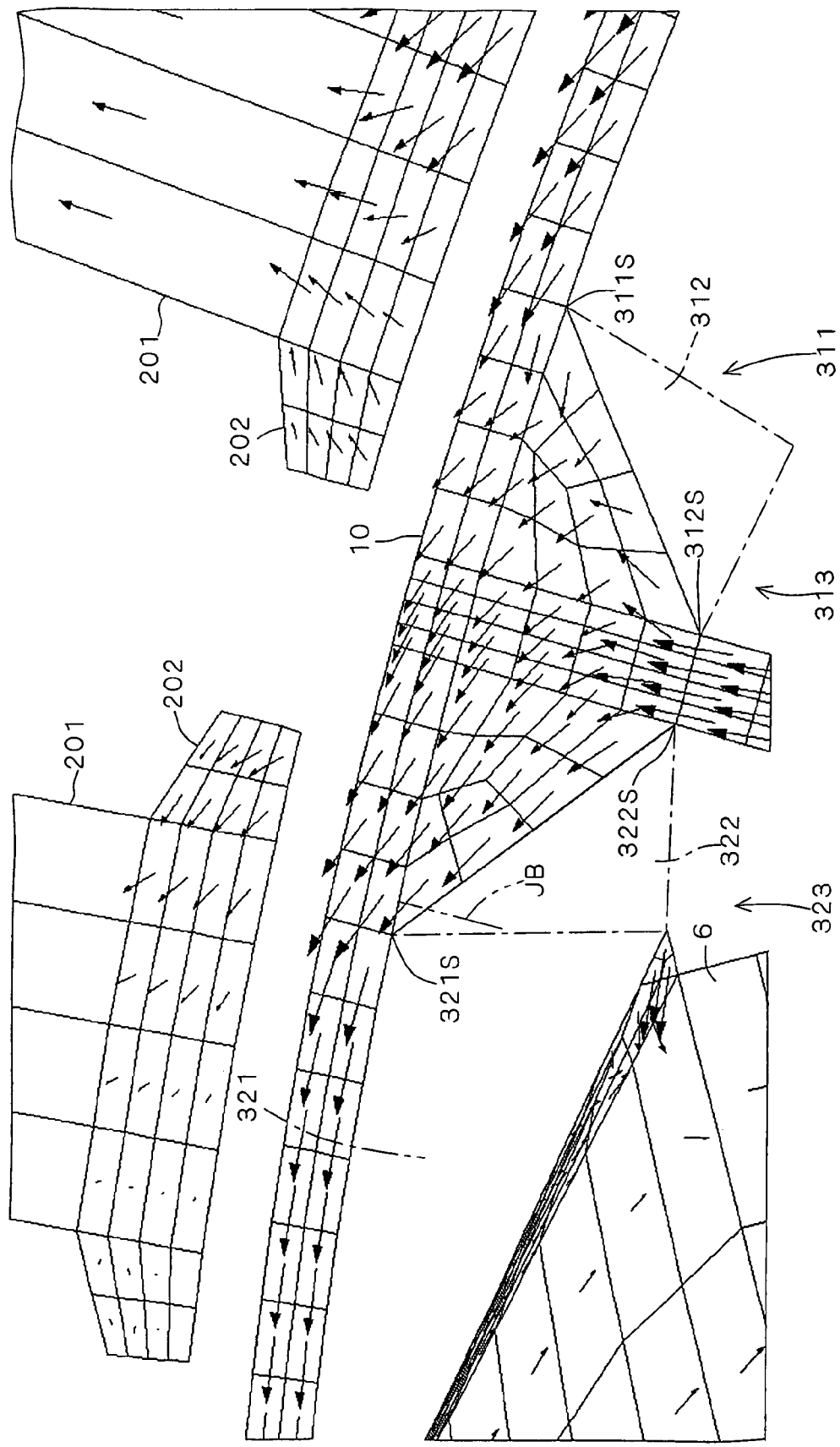

FIGS. 18 and 19 are results of simulations indicating flux vectors in a rotor and a stator, and shown in the same way as FIGS. 13 and 14 except that the rotation angles are different. FIG. 18 shows the case in which the structure of L1=L2 is employed for the rotor, and FIG. 19 shows the case in which the structure of L2>L1 (i.e., the rotor according to the present invention) is employed. In both FIGS. 18 and 19, a dash-and-dot line JB in the radial direction shows the position where the positional angle is approximately 4°.

In FIG. 19, as compared to FIG. 18, the flux vector in the position indicated by the dash-and-dot line JB in the radial direction has a larger radial component, although the circumferential component is little different. This is considered because setting L2>L1 increases the thickness of the magnetic member in the circumferential direction in the opposite direction as the direction that the flux vector at that position is directed, in other words, the amount of magnetic member between the second portion 322 and periphery 10 is greater than in the structure shown in FIG. 18. That is, in the structure shown in FIG. 19, it is considered because the flux vector at the position in the circumferential direction indicated by the dash-and-dot line JB is more likely to be directed to the side of the widened portion 202 of the stator than in the structure shown in FIG. 18.

Accordingly, the increase in the radial component while the circumferential component of the flux vector hardly changes increases the rotor surface-force tangent component. This is considered the reason why the curve F2B appearing in FIG. 12 is smaller than the curve F1B.

Considering the above more qualitatively, it can also be considered as follows: that is, as compared to the case where the magnetic member is not increased in thickness in the vicinity of the border of magnetic poles of the rotor (L1=L2) as shown in FIG. 9, increasing the thickness of the magnetic member at that position lessens the dependence of torque on rotation angle. This is considered because the magnetic member increased in thickness in the vicinity of the border of magnetic poles of the rotor improves the irregularity of the flow of magnetic fluxes between the stator and rotor.

Second Embodiment

Figure 20:
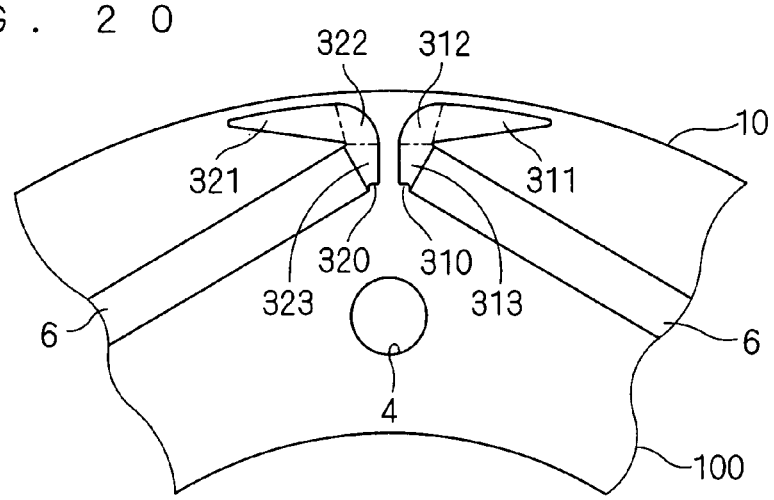
FIG. 20 is a sectional view partially showing the structure of a rotor according to a second embodiment of the present invention.

FIG. 20 is a sectional view partially showing the structure of a rotor 100 according to a second embodiment of the present invention. Of course, a structure in which the field magnets 6 are omitted from that rotor 100 can be understood as the magnetic member 1 according to the present invention.

The rotor 100 in the present embodiment features changing the distance between the second portions 312, 322 and periphery 10 in a curve in the circumferential direction, and is similar to the technique described in the first embodiment except this point. Also with such structure, the magnetic member is increased in thickness in the vicinity of the border of magnetic poles of the rotor explained in the first embodiment, so that the difference in thickness of the magnetic member in the radial direction between the border and center of magnetic poles can be reduced. The torque ripple can thereby be reduced, similarly to the first embodiment. Of course, the asymmetry of the configuration of the rotor 100 is not absolutely necessary, and the outer surface does not need to be depressed.

Third Embodiment

Figure 21:
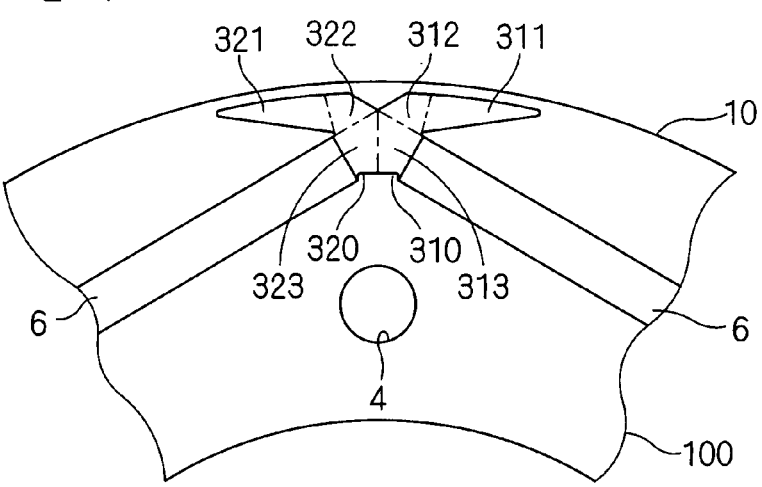
FIG. 21 is a sectional view partially showing the structure of a rotor according to a third embodiment of the present invention.

FIG. 21 is a sectional view partially showing the structure of a rotor 100 according to a third embodiment of the present invention. Of course, a structure in which the field magnets 6 are omitted from that rotor 100 can be understood as the magnetic member 1 according to the present invention.

The rotor 100 in the present embodiment features communicating a pair of third portions 313 and 323 adjacent to each other respectively belonging to adjacent field magnet through-holes 2, and is similar to the technique described in the first embodiment except this point. Also with such structure, it is apparent that the operations and effects explained in the first embodiment can be obtained. Further, in the structure shown in the second embodiment, the third portions 313 and 323 may be communicated with each other.

However, it is desirable that the third portions 313 and 323 be adjacent separately in terms of mechanical strength in the vicinity of the gaps 31 and 32, that is, in the vicinity of the border of magnetic poles of the rotor.

Further, by communicating the third portions 313 and 323 with each other, the torque ripple slightly increases. For instance, in the case where L1=0.7 mm, L2=3.2 mm, θ1=25°, θ2=7.5° and θ3=22°, the torque ripple rate is 12.2%, which is higher than the torque ripple rate of 8.1% obtained by the structure in which the third portions 313 and 323 are adjacent separately. However, it is understood that there still is the effect of reduction in torque ripple rate, as compared to the torque ripple rate of 20.8% obtained by the structure in which L1=L2=0.7 mm.

Fourth Embodiment

Figure 22:
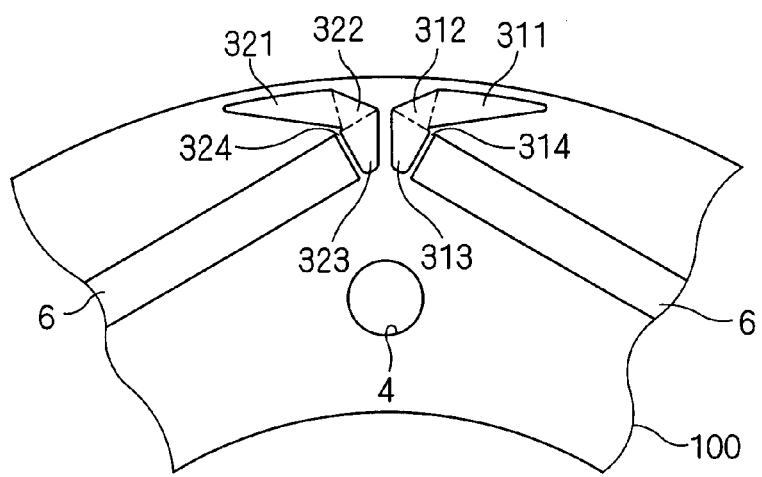
FIG. 22 is a sectional view partially showing the structure of a rotor according to a fourth embodiment of the present invention.

FIG. 22 is a sectional view partially showing the structure of a rotor 100 according to a fourth embodiment of the present invention. Of course, a structure in which the field magnets 6 are omitted from that rotor 100 can be understood as the magnetic member 1 according to the present invention.

The rotor 100 in the present embodiment features separating a pair of third portions 313 and 323 adjacent to each other respectively belonging to adjacent field magnet through-holes 2, from the field magnet through-holes 2, respectively, and is similar to the technique described in the first embodiment except this point. The magnetic member is present between the third portions 313, 323 and the field magnet through-holes 2 as ribs 314 and 324, respectively.

Also with such structure, it is apparent that the operations and effects explained in the first embodiment can be obtained. Further, in the structure shown in the second embodiment, the third portions 313 and 323 may be separated from the field magnet through-holes 2. Employing such structure brings the advantages of increasing the mechanical strength, and in addition, eliminating the recesses 310 and 320.

Figure 23:
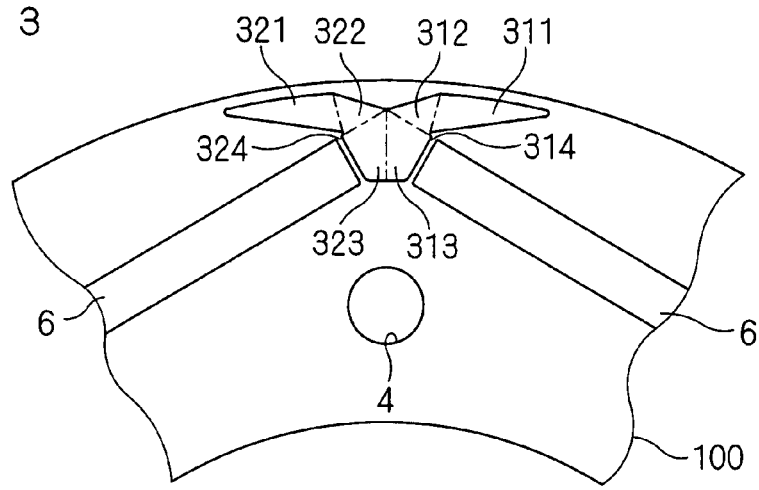
FIG. 23 is a sectional view partially showing the structure of a rotor according to a variation of the fourth embodiment of the present invention.

In that structure, the third portions 313 and 323 may be communicated with each other, as shown in the third embodiment. FIG. 23 is a sectional view showing the structure as modified in such a manner.

Fifth Embodiment

Figure 24:
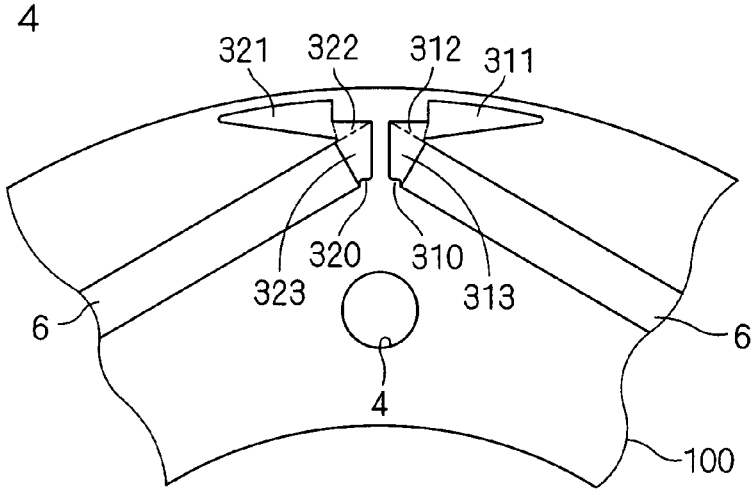
FIG. 24 is a sectional view partially showing the structure of a rotor 100 according to a fifth embodiment of the present invention.
Figure 25:
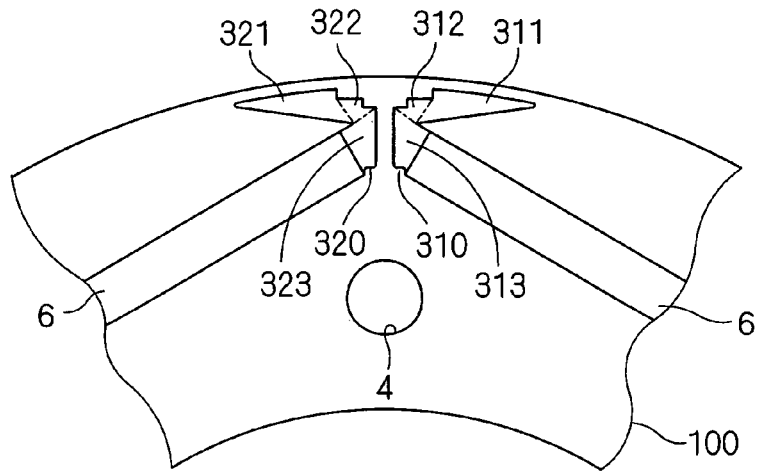
FIG. 25 is a sectional view partially showing the structure of a rotor 100 according to the fifth embodiment of the present invention.

FIGS. 24 and 25 are sectional views partially showing the structure of a rotor 100 according to a fifth embodiment of the present invention. Of course, a structure in which the field magnets 6 are omitted from that rotor 100 can be understood as the magnetic member 1 according to the present invention.

The rotor 100 in the present embodiment features changing the distance between the second portions 312, 322 and periphery 10 stepwise in the circumferential direction, and is similar to the technique described in the first embodiment except this point. Also with such structure, it is apparent that the operations and effects as explained in the first embodiment can be obtained. The number of steps may be selected according to necessity as shown in FIGS. 24 and 25.

The stepwise change of the distance between the second portions 312, 322 and periphery 10 in the circumferential direction slightly increases the torque ripple. For instance, in the case where L1=0.7 mm, L2=3.2 mm, θ1=25°, θ2=7.5° and θ3=22°, the torque ripple rate was 13.2%. However, it is understood that there is the effect of reduction in torque ripple rate, as compared to the torque ripple rate of 20.8% obtained by the structure in which L1=L2=0.7 mm.

In the present embodiment, a modification in which a pair of third portions 313 and 323 adjacent to each other respectively belonging to adjacent field magnet through-holes 2 are communicated with each other can also be made, as in the third embodiment. Alternatively, a modification in which the third portions 313 and 323 are respectively separated from the field magnet through-holes 2 can be made, as in the fourth embodiment.

While the invention has been shown and described in detail, the foregoing description is in all aspects illustrative and not restrictive. It is therefore understood that numerous modifications and variations can be devised without departing from the scope of the invention.

What is claimed is:

1. A magnetic member comprising:
   a periphery;
   a plurality of field magnet through-holes disposed annularly in a circumferential direction, each having a pair of ends in the circumferential direction; and
   a pair of gaps respectively provided at said pair of ends, wherein
   one of said pair of gaps of respective said field magnet through-holes
      (i) extends toward the other one of said pair of gaps passing on a side of said periphery with respect to said respective said field magnet through-holes;
      (ii) has a first portion spaced from said periphery at a constant first distance in the circumferential direction and a second portion spaced from said periphery at a second distance, said second distance gradually increasing while extending from said first portion toward an adjacent one of said respective said field magnet through-holes adjacent on a side of one of said pair of ends corresponding to said second portion; and
      (iii) further has a third portion provided between said second portion and said one of said pair of ends.

2. The magnetic member according to claim 1, wherein in said one of said pair of gaps, said first portion has a width in a radial direction gradually decreasing with separation from said second portion in the circumferential direction, and an angle of an end of said first portion on an opposite side of said second portion is between 15 and 25 degrees.

3. The magnetic member according to claim 1, wherein $0.4 \text{ mm} \leq L1 \leq 2.0 \text{ mm}$ and $0.8 \cdot L1 + 1.0 \text{ mm} \leq L2 \leq 0.75 \cdot L1 + 3.7 \text{ mm}$, where
   L1 represents said first distance, and
   L2 represents said second distance at an end of said second portion on a side of said third portion.

4. The magnetic member according to claim 1, wherein the second distance between said second portions and said periphery changes linearly in the circumferential direction.

5. The magnetic member according to claim 1, wherein the second distance between said second portion and said periphery changes in a curve in the circumferential direction.

6. The magnetic member according to claim 1, wherein the second distance between said second portion and said periphery changes stepwise in the circumferential direction.

7. The magnetic member according to claim 1, wherein said third portions of first said pair of said gaps and said third portion of second said pair of said gaps are adjacent separately, said first said pair of said gaps and said second said pair of said gaps being adjacent to each other respectively belonging to adjacent ones of said field magnet through-holes.

8. The magnetic member according to claim 1, wherein said third portions of first said pair of said gaps and said third portion of second said pair of said gaps are communicated with each other, said first said pair of said gaps and said second said pair of said gaps being adjacent to each other respectively belonging to adjacent ones of said field magnet through-holes.

9. The magnetic member according to claim 1, wherein said third portions of said one of said pair of gaps and one of said field magnet through-holes corresponding thereto are communicated with each other.

10. The magnetic member according to claim 9, wherein said one of said pair of gaps further has recesses in said third portions on a side of said field magnet through-holes corresponding thereto.

11. The magnetic member according to claim 1, wherein said third portions of said one of said pair of gaps and one of said field magnet through-holes corresponding thereto are adjacent separately.

12. A rotor comprising:
the magnetic member defined in claim 1; and
field magnets inserted into said field magnet through-holes.

13. A motor comprising:
the rotor defined in claim 12; and
a stator provided on the side of said periphery with a predetermined space from said rotor.

* * * * *